W. P. B. HAMILTON & H. VOGLESONG.
FLEXIBLE SHAFT COUPLING.
APPLICATION FILED DEC. 8, 1914.
1,182,904. Patented May 16, 1916.
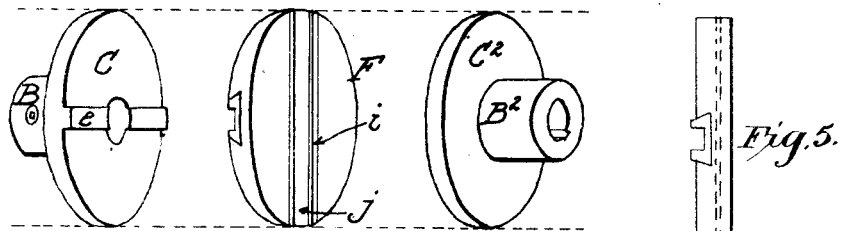
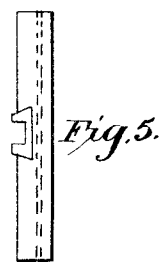
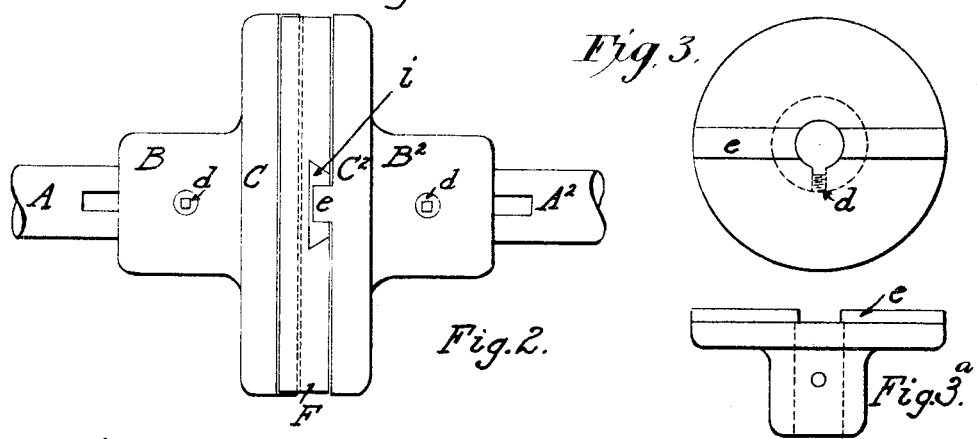
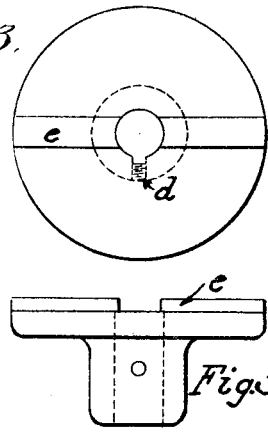
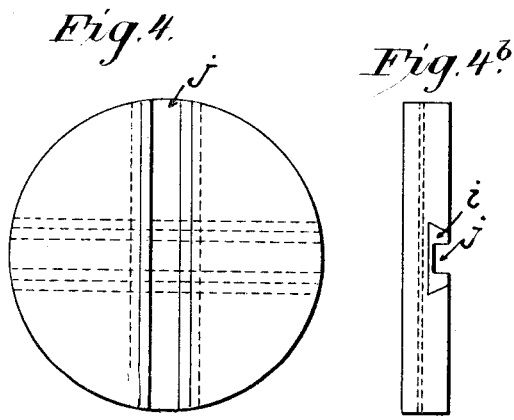
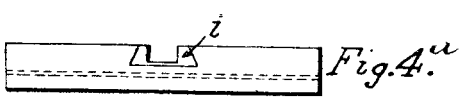
WITNESSES:
Albert E. Thayer.
Jeanette M. O'Connor.
INVENTORS
William P. B. Hamilton
Henry Voglesong
BY
John H. Hilliard
ATTORNEY

UNITED STATES PATENT OFFICE.

WILLIAM P. B. HAMILTON AND HENRY VOGLESONG, OF JERSEY CITY, NEW JERSEY.

FLEXIBLE SHAFT-COUPLING.

1,182,904.  Specification of Letters Patent.  Patented May 16, 1916.

Application filed December 8, 1914. Serial No. 876,017.

*To all whom it may concern:*

Be it known that we, WILLIAM P. B. HAMILTON and HENRY VOGLESONG, citizens of the United States, and residents of the city of Jersey City, in the county of Hudson and State of New Jersey, have jointly invented certain new and useful Improvements in Flexible Shaft-Couplings, of which the following is a specification.

One object of our invention is to provide a means for detachably coupling the driving end of one shaft with the driven end of another shaft, and at the same time insulating the one from the other, even though the shafts be running at high speed and the coupling be subjected to a maximum of stress.

Another object of our invention is to provide a detachable insulating shaft-coupling which will be adaptable for high speed or a maximum of stress and which will be in operative connection although the axes of the coupled shafts vary in a slight degree from a position of axial alinement and even though the axis of the one shaft intersect the axis of the other at a slight angle near the junction of the shafts.

Another object of our invention is to provide a detachable shaft coupling that will produce a minimum of noise and vibration when in operation and which will be subject to a minimum of wear on the connecting parts and require little or no lubrication.

In the accompanying drawings, Figure 1 is a detached perspective view of the coupling constituting our invention; Fig. 2 is a side elevation of the coupling showing the parts assembled in operative connection; Fig. 3 is an end elevation of one of the members of the coupling; Fig. 3$^a$ is a bottom view of the member shown in Fig. 3 and Fig. 4 is an end elevation of what we term the key disk of our coupling; Fig. 4$^a$ is a bottom edge view of the part shown in Fig. 4; Fig. 4$^b$ is a side edge view of the part shown in Fig. 4; Fig. 5 is a side elevation of the key disk showing a modified form of construction of the same.

Referring to the said drawings, on each of the shafts A and A$^2$ is mounted a coupling member composed of collars B and B$^2$ which form the hubs of the disks C and C$^2$. The collars B and B$^2$ are fixed against rotation on the shafts A and A$^2$ by means of key sets and they may be adjusted longitudinally on the shafts A and A$^2$ by means of binding screws $d$. The face of each of the disks C and C$^2$ is provided with a diametrical lug, but inasmuch as the two coupling members are substantially identical in construction, the lug is shown in the drawings on only one of the disks as indicated by the letter $e$.

For the purpose of locking the two side members in operative connection we provide a key disk F which is constructed as follows: Two rectangular plates $i$ of fiber or other electrically insulating material are each provided with a longitudinal slot or groove $j$ of proper width to engage the lugs $e$ and slide easily thereon. These plates are contained in slots one in each face of the key disk F which may be of metal, and the exposed surfaces of these plates are preferably flush with the faces of the latter, although they may project or extend therefrom to a slight extent. The latter construction is shown in Fig. 5. The plates $i$ thus form a lining for the slots in the face of the key disk F in which they are inserted, and prevent the lugs $e$ from coming in contact with the metal of the key disk F. In the form of construction in which the exposed surfaces of the plates $i$ are flush with the faces of the key disk, it is desirous that the slots $j$ be of a depth less than the height of the lugs $e$ so that a space will intervene between the faces of the coupling members and the metal surfaces of the key disk even though the lugs $e$ be inserted in the slot $j$ to their full extent. If, however, the exposed surfaces of the plates $i$ be allowed to extend beyond the metal faces of the key disk the depth of the slots $j$ may be as great or even greater than the height of the lugs $e$.

The plates $i$ are so located in the faces of the key disk F that the slots $j$ will be at right angles to each other. The plates $i$ may be rigidly retained in the slots in the key disk F by dove-tailing, riveting or any other convenient method. These slots $j$ should preferably be diametrically located with respect to the key disk but such accuracy of location is not essential to the operation of our device. For simplicity and cheapness of manufacture and facility of adjustment it is desirous that the two coupling members be of similar construction and dimensions. Such a condition need not, however, be complied with if it is desired for any purpose to differentiate the dimensions of the coupling members or of the lugs *c* in which event the dimensions of the slots of the key disk may be differentiated accordingly.

It will be seen that in this construction the maximum resisting power of the material which insulates the coupling members from one another is utilized, and that, although the axis of one shaft be out of alinement with the axis of the other and even though the axes of the shafts intersect at a slight angle near the junction of the shafts, the coupling members are still insulated from one another and the coupling is still operative. It will also be seen that even though insulation is not desired or necessary, the device nevertheless possesses the advantage of having its bearing surfaces constructed of metal and fiber working upon each other, with a consequent great power of resistance to wear, lack of necessity for lubrication and a minimum of noise and vibration.

It is realized that the relative position of the lugs and slots may be reversed, that is, the lugs may extend from the key disk and the slots may be cut in the coupling members without departing from the spirit of our invention. In that case the lugs should be located on the disk at right angles to each other, and the slots in the coupling members should be diametrical, and the fiber should be located in the latter.

We claim as our invention:

1. In a shaft coupling, two coupling members, each member consisting of a disk mounted on a hub, said disk being provided with a diametrical lug, a key disk of metal having inserted in either face in diametrical position a plate of fiber, said plates being at right angles to each other and each provided with a longitudinal slot of proper width to engage said lugs and of a depth less than the height of said lugs.

2. In a shaft coupling, two coupling members, each of which is provided with a lug passing through its axis, a key disk of metal having inserted in either face in diametrical position a plate of fiber, said plates being at right angles to each other and each provided with a longitudinal slot of proper width to engage said lugs and of a depth less than the height of said lugs.

3. In a shaft coupling, two coupling members, each of which is provided with a lug passing through its axis, a key disk of metal having inserted in either face in diametrical position a plate of electrically insulating material, said plates being at right angles to each other and each provided with a longitudinal slot of proper width to engage said lugs and of a depth less than the height of said lugs.

4. In a shaft coupling, two coupling members, each of which is provided with a lug passing through its axis, a key disk of metal having inserted in either face in diametrical position a plate of electrically insulating material, said plates being at right angles to each other and projecting slightly from the surface of the face of the said key disk and each provided with a longitudinal slot of proper width to engage said lugs.

5. In a shaft coupling, two coupling members, each of which is provided with a lug passing through its axis, a key disk of metal having on either face a groove of proper width to engage said lugs, said groove being lined with electrically insulating material, each groove being of proper width to engage said lugs, but of a depth less than the height of said lugs.

6. In a shaft coupling, two coupling members, each of which is provided with a lug passing through its axis, a key disk of metal having on either face a groove of proper width to engage said lugs, said groove being lined with fiber, each groove being of proper width to engage said lugs, but of a depth less than the height of said lugs.

7. In a shaft coupling, two coupling members, each of which is provided with a lug passing through its axis and at right angles thereto, a key disk of metal having on each face a diametrical slot, said slots being at right angles to each other and lined with electrically insulating material, and of a proper width to engage said lugs and slide thereon and of a depth less than the height of said lugs.

8. In a shaft coupling, two coupling members each of which is provided with a lug passing through its axis and at right angles thereto, a key disk of metal each face of which is provided with a transverse slot, said slots being at right angles to each other and lined with electrically insulating material, and of a proper width to engage said lugs and slide thereon, and of a depth less than the height of said lugs.

9. In a shaft coupling, two coupling members, each of which is provided with a lug passing through its axis and at right angles thereto, a key disk having inserted in each face a plate of electrically insulating material the exposed surfaces of said plates extending slightly beyond the face of the said key disk, each of said plates being provided with a slot therein, the said slots being at right angles to each other and of a proper width to engage said lugs and slide thereon.

10. In a shaft coupling, two coupling members, each of which is provided with a lug passing through its axis and at right angles thereto, a key disk having inserted in each face a plate of electrically insulating material, each of said plates being provided with a slot therein, the said slots being at right angles to each other, and of a proper width to engage said lugs and slide thereon, the distance from the bottom of said slots to the surfaces of the key disk in which they are respectively located being slightly less than the height of said lugs.

11. In a shaft coupling, two coupling members, each of which is provided with a lug passing through its axis and at right angles thereto, a key disk of metal each face of which is provided with a transverse slot, said slots being at right angles to each other and lined with electrically insulating material and of proper dimensions to engage said lugs and slide thereon.

12. In a shaft coupling, two coupling members, each of which is provided with a diametrical lug, a disk of non-insulating material between said members and insulated therefrom, said disk having a transverse slot in each face, said slots being at right angles to each other and of proper dimensions to engage said lugs.

13. In a shaft coupling, two coupling members each of which is provided with a diametrical lug, a metal disk between said members having a transverse slot in each face, said slots being at right angles to each other and of proper dimensions to engage said lugs, said disk being insulated from said members.

14. In a flexible shaft coupling, two coupling members engaged by a key disk of metal, said key disk being insulated from said members.

15. In a flexible shaft coupling, two coupling members, a key disk of non-insulating material between said members, said key disk being insulated from said members.

16. In a flexible shaft coupling, two coupling members, an engaging disk therefor which is composed of metal, except that portion of the surface of said engaging disk which comes in contact with said coupling members, which said portion is composed of fiber.

17. In a flexible shaft coupling, two coupling members, a locking disk therefor of metal, the portion of the surface of said locking disk which engages the said coupling members being covered with fiber.

18. In a flexible shaft coupling, two coupling members, a locking disk therefor of metal, contact between said locking disk and said coupling members being prevented by the interposition of fiber.

Signed at the city of New York, in the county of New York and State of New York, this 18th day of November, A. D. 1914.

WM. P. B. HAMILTON.
HENRY VOGLESONG.